United States Patent
Carrette et al.

(10) Patent No.: US 9,268,317 B2
(45) Date of Patent: Feb. 23, 2016

(54) ECONOMICS-BASED COORDINATION OF ADVANCED PROCESS CONTROL AND REAL-TIME OPTIMIZATION

(75) Inventors: Pierre Christian Marie Carrette, Seria (BX); Richard Eugene Linn, Sugar Land, TX (US); Aswin Nataraj Venkat, Houston, TX (US)

(73) Assignee: Shell Oil Company, Houston, TX (US)

( * ) Notice: Subject to any disclaimer, the term of this patent is extended or adjusted under 35 U.S.C. 154(b) by 934 days.

(21) Appl. No.: 13/512,900

(22) PCT Filed: Nov. 30, 2010

(86) PCT No.: PCT/US2010/058390
§ 371 (c)(1),
(2), (4) Date: May 31, 2012

(87) PCT Pub. No.: WO2011/068794
PCT Pub. Date: Jun. 9, 2011

(65) Prior Publication Data
US 2012/0239167 A1 Sep. 20, 2012

Related U.S. Application Data

(60) Provisional application No. 61/266,018, filed on Dec. 2, 2009.

(51) Int. Cl.
*G05B 13/04* (2006.01)
*G05B 19/418* (2006.01)

(52) U.S. Cl.
CPC ........ *G05B 13/042* (2013.01); *G05B 19/41865* (2013.01); *G05B 2219/32015* (2013.01); *G05B 2219/32019* (2013.01); *G05B 2219/32135* (2013.01); *G05B 2219/32291* (2013.01)

(58) Field of Classification Search
CPC ...... G05B 11/32; G05B 13/00; G05B 13/024; G05B 13/042; G05B 13/048; G06Q 10/04; G06Q 10/06; G06Q 10/06375; G06Q 30/0201; G06Q 30/0206
USPC .......... 700/28, 29, 32–34, 36; 705/7.11, 7.12, 705/7.29, 7.31, 7.35–7.37; 703/2
See application file for complete search history.

(56) References Cited

U.S. PATENT DOCUMENTS 5,351,184 A   9/1994   Lu et al.
5,486,995 A * 1/1996   Krist et al. ...................... 700/29

(Continued)

FOREIGN PATENT DOCUMENTS

CN   101055467   10/2007
CN   101067743   11/2007
RU   2204148     5/2003

OTHER PUBLICATIONS

Takatsu, Haruo: Advanced controloptimization solution, Yokogawa Technological Report published by Yokogawa Electric Corporation on Sep. 15, 2006, vol. 50, No. 3, pp. 87-90.

*Primary Examiner* — Crystal J Barnes-Bullock (57) ABSTRACT

A system and method for coordinating advanced process control and real-time optimization of a manufacturing process are provided. The system and method receive process data and economic data corresponding to the manufacturing process to be controlled and optimized. Based on the process data, the economic data and a nonlinear steady-state model of the process, an economic objective function is calculated by a real-time optimization module. A reduced-order non-linear approximation of the economic objective function is thereafter calculated by the real-time optimization module and transmitted to an advanced process control module. The advanced process control module utilizes the reduced-order non-linear approximation of the economic objective function to control the manufacturing process towards the constrained economic optimum.

18 Claims, 9 Drawing Sheets

(56) References Cited

U.S. PATENT DOCUMENTS

| | | | |
|---|---|---|---|
| 5,561,599 A | 10/1996 | Lu | |
| 5,572,420 A | 11/1996 | Lu | |
| 5,574,638 A | 11/1996 | Lu | |
| 5,682,309 A * | 10/1997 | Bartusiak | G05B 13/048 700/29 |
| 5,740,033 A * | 4/1998 | Wassick et al. | 700/29 |
| 5,758,047 A | 5/1998 | Lu et al. | |
| 6,038,540 A * | 3/2000 | Krist et al. | 705/7.33 |
| 6,055,483 A | 4/2000 | Lu | |
| 6,122,555 A | 9/2000 | Lu | |
| 6,487,459 B1 | 11/2002 | Martin et al. | |
| 6,532,454 B1 * | 3/2003 | Werbos | G05B 13/027 706/14 |
| 7,330,767 B2 * | 2/2008 | Thiele et al. | 700/29 |
| 7,376,472 B2 * | 5/2008 | Wojsznis et al. | 700/29 |
| 8,417,360 B2 * | 4/2013 | Sustaeta et al. | 700/28 |
| 8,914,300 B2 * | 12/2014 | Sustaeta et al. | 705/7.12 |
| 2002/0072828 A1 | 6/2002 | Turner et al. | |
| 2002/0158636 A1 | 10/2002 | Tyan et al. | |
| 2002/0176443 A1 | 11/2002 | Wei et al. | |
| 2003/0033040 A1 | 2/2003 | Billings | 700/7 |
| 2003/0120361 A1 | 6/2003 | Anderson et al. | |
| 2004/0049295 A1 | 3/2004 | Wojsznis et al. | 700/28 |
| 2004/0133616 A1 | 7/2004 | Manevitz et al. | |
| 2004/0158339 A1 | 8/2004 | Kawase et al. | |
| 2004/0204775 A1 | 10/2004 | Keyes et al. | 700/29 |
| 2005/0154700 A1 | 7/2005 | Lele | 707/1 |
| 2006/0136275 A1 | 6/2006 | Cotora | |
| 2006/0142886 A1 | 6/2006 | Ishibashi et al. | |
| 2007/0050070 A1 | 3/2007 | Strain et al. | |
| 2007/0083281 A1 | 4/2007 | Chen et al. | |
| 2007/0100475 A1 | 5/2007 | Korchinski | 700/28 |
| 2007/0260335 A1 | 11/2007 | Fan et al. | |
| 2008/0172280 A1 | 7/2008 | Goulimis | |
| 2008/0215386 A1 | 9/2008 | Eder | |
| 2009/0187265 A1 | 7/2009 | Wan et al. | |
| 2009/0210081 A1 | 8/2009 | Sustaeta et al. | 700/99 |
| 2011/0098862 A1 * | 4/2011 | Andrei | G05B 19/41865 700/272 |
| 2013/0282146 A1 * | 10/2013 | Lu | G05B 19/042 700/29 |

\* cited by examiner

FIG. 2

ECONOMICS-BASED COORDINATION OF ADVANCED PROCESS CONTROL AND REAL-TIME OPTIMIZATION

PRIORITY CLAIM

The present application claims priority from PCT/US2010/058390, filed 30 Nov. 2010, which claims priority from U.S. provisional application 61/266,018, filed 2 Dec. 2009.

FIELD OF THE INVENTION

Control of a manufacturing process using an economic objective function.

BACKGROUND OF THE INVENTION

One objective of a manufacturing process is to convert raw materials into desired products in the presence of ever-changing external influences such as air temperature, water temperature, etc. and requirements such as product specifications, operational constraints and safety and environmental regulations. The primary incentive for using advanced process control (APC) and real time optimization (RTO) is to steer system operation in regions that maximize profits in the presence of constraints.

In current practice, this incentive is pursued using a remote set-point/target passing framework between an RTO module and an APC module. This remote set-point passing strategy between an RTO module and an APC module is essentially a translation of the main economic objective into a process control objective. For example, in a conventional process automation scheme, an RTO module attempts to drive an APC module to the most economic operating point by communicating targets for a set of process control variables (e.g. all process control variables or a subset of process control variables). Specifically, the RTO module generally contains a rigorous, nonlinear, steady-state model of the economics and constraints of the process to be controlled. When the process is in a steady-state (i.e. a state in which a set of defined variables are within a prescribed tolerance of variability), the RTO module uses this model to calculate an economically optimum operating point which is communicated to the APC module in the form of targets for specific process control variables. The APC module, executing at a much higher frequency than the RTO module, attempts to dynamically drive the process variables towards their respective targets while honoring all constraints. The APC module continues to drive the process variables towards their respective targets until new targets are received from the RTO system.

In the conventional approach to coordinating operations between an RTO module and an APC module, as described above, the targets passed by the RTO module to the APC module represent a constrained economic optimum at the time when the RTO module pulled process, constraint and economic data. This constrained economic optimum represents the optimum according to constraints applied to various advance process control variables in the process by operators, engineers, or others. However, the APC module has no knowledge of the unconstrained economic optimum, which represents the optimum without consideration of constraints.

Figure 1A:
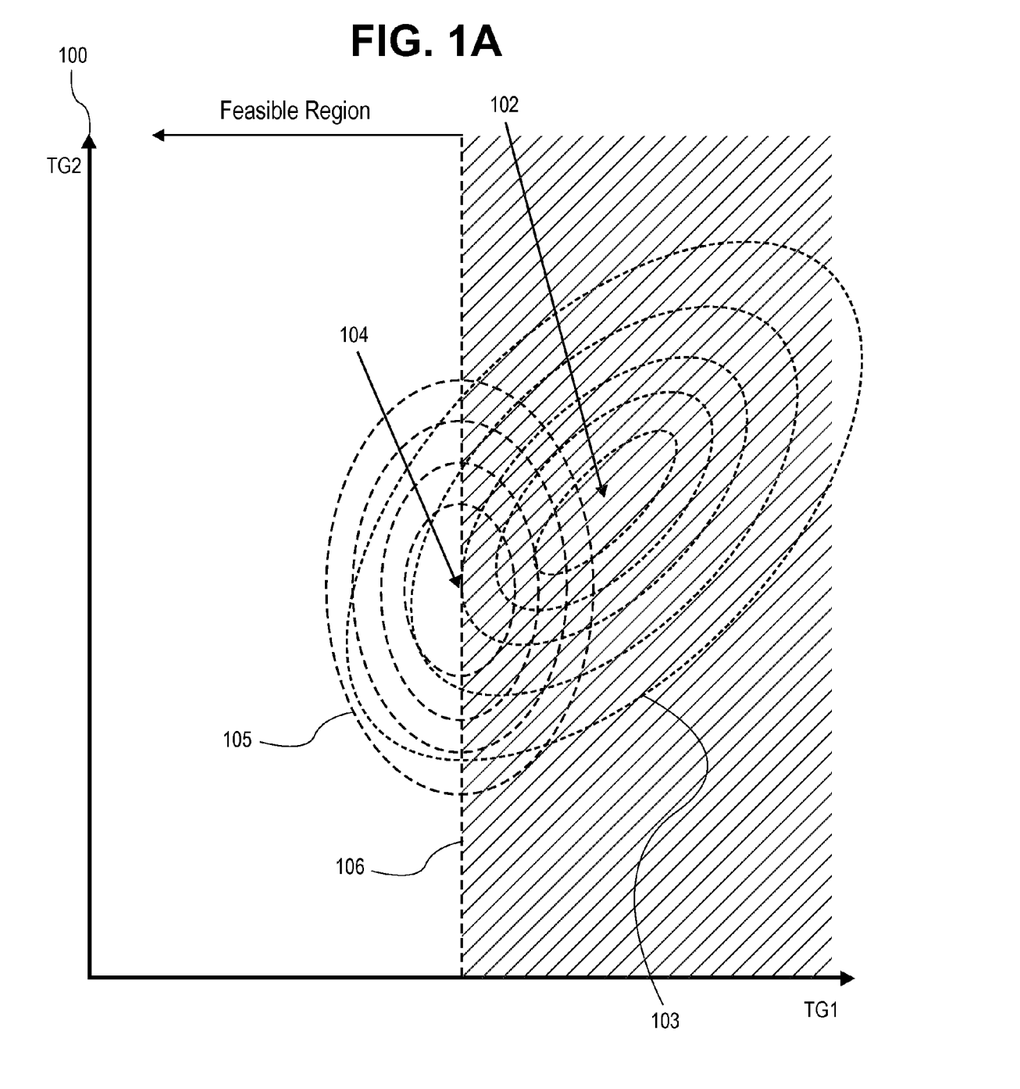

FIG. 1a illustrates the locations of unconstrained economic optimum 102 and constrained economic optimum 104 in graph 100 of the process control variables TG1 and TG2 which relate to a manufacturing process. Each circle in contour 103 represents constant value of the economic objective function used by the RTO module. Contour 105 represents the APC objective function which minimizes the distance from constrained economic optimum 104, where distance is measured as a weighted sum of the squared differences between the values of the variables and their targets. For example, TG1 may relate to the flow rate of a process stream in a production process that might be utilized in a petrochemical plant and TG2 may relate to the temperature of a stream. The manufacturing process represented in graph 100, is controlled by a process control and optimization system of the prior art which includes a RTO module and an APC module working in conjunction to drive the manufacturing process towards an economic optimum which honors all constraints. Constraint 106 limits the feasible values for process control variable TG1. Adhering to constraint 106, the RTO module will determine constrained economic optimum 104 for the manufacturing process which is comprised of a specific value for each of TG1 and TG2. For example, in the situation described above in which TG1 represents the feed flow rate of a substance at the inlet of a reactor vessel performing the manufacturing process, constraint 106 may be set by an operator of the manufacturing process to a maximum of ten cubic meters per second. Thus, based on constraint 106, the RTO module will transmit a target for TG1 to the APC module that is less than or equal to ten cubic meters per second along with a target for TG2. For example, the RTO module may send to the APC module a TG1 target of ten cubic meters per second and a TG2 target of 120 degree Celsius. These targets represent constrained economic optimum 104 at which the manufacturing process is most profitable while adhering to all constraints (i.e. constraint 106). The APC module in turn drives feed flow rate TG1 toward the ten cubic meters per second and temperature TG2 toward 120 degrees Celsius. Although there are values for TG1 and TG2 which provide greater profitability for the manufacturing process (e.g. unconstrained economic optimum 102), these values for TG1 and TG2 do not honor constraint 106. Thus, steering the manufacturing process towards constrained economic optimum 104 is ideal while constraint 106 remains at the same location in graph 100.

Upon the occurrence of a disturbance which moves constrained economic optimum 104, the targets set for TG1 and TG2 by the RTO module are no longer optimal. For example, a disturbance may occur which changes constraint 106 such that more "room" is provided for TG1. For example, an operator may change constraint 106 to twelve cubic meters per second.

Figure 1B:
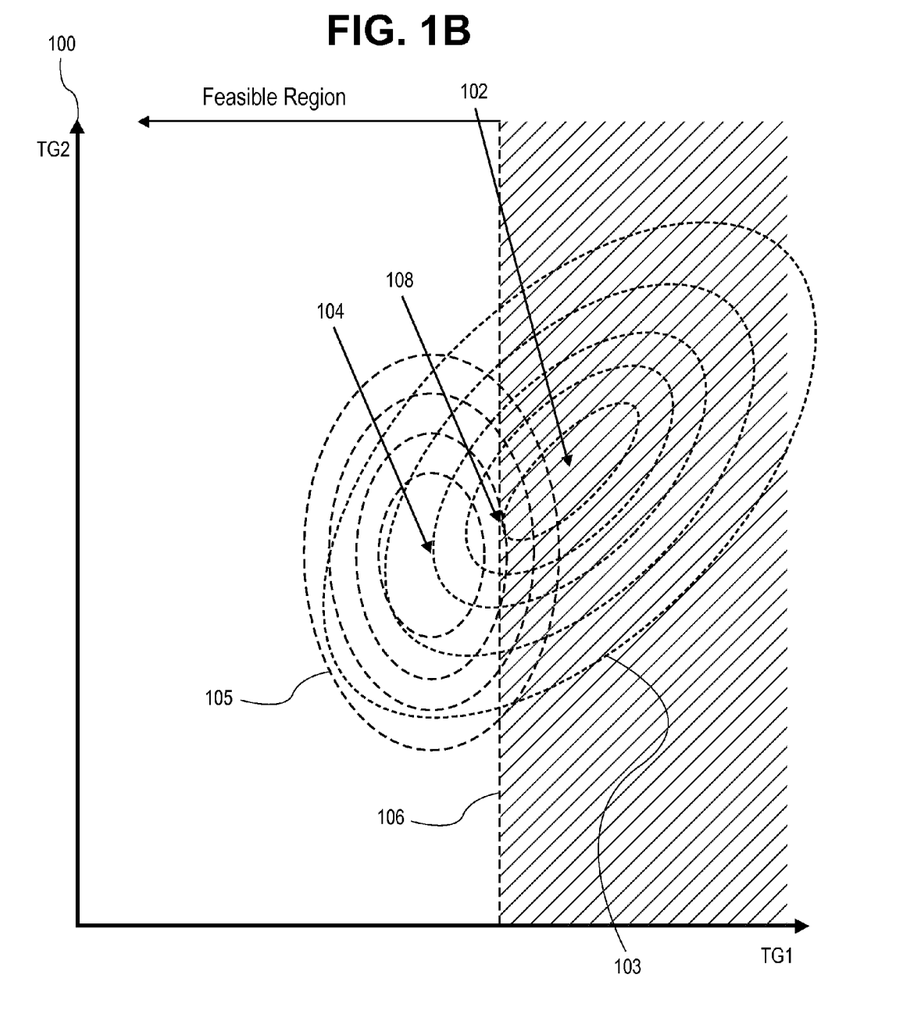

FIG. 1b illustrates graph 100 upon the occurrence of the disturbance described above. Unconstrained economic optimum 102 remains in the same location as before while new constrained economic optimum 108 has been created based on the disturbance. New constrained economic optimum 108 is closer to unconstrained economic optimum 102 than constrained economic optimum 104, because the change in constraint 106 allows new constrained economic optimum 108 to take advantage of the greater room for TG1. Under the traditional set-point process control system, the APC module would be unaware of the new constrained economic optimum 108 until the RTO submitted new set-point targets which corresponded to new constrained economic optimum 108.

Alternatively, a disturbance may occur which changes constraint 106 such that less "room" is provided for TG1, making the targets set for TG1 and TG2 by the RTO module no longer feasible. For example, an operator may change constraint 106 to eight cubic meters per second.

Figure 1C:
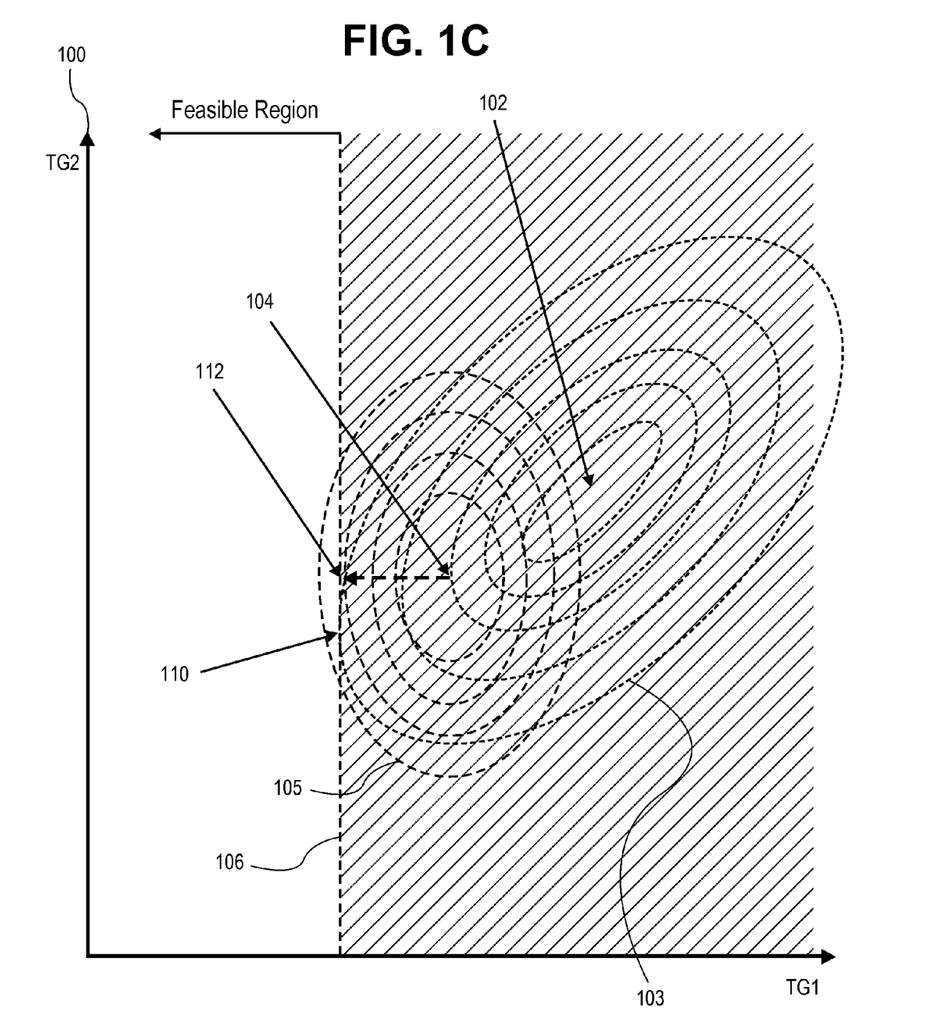

FIG. 1c illustrates graph 100 upon the occurrence of the disturbance described above. Unconstrained economic optimum 102 remains in the same location as before while new constrained economic optimum 110 has been created based on the disturbance. New constrained economic optimum 110 is further from unconstrained economic optimum 102 than constrained economic optimum 104, because the change in constraint 106 makes constrained optimum 104 infeasible. Under the traditional set-point process control system, the APC module would attempt to find a feasible point that minimized the distance from constrained economic optimum 104, based on its non-economic objective function. In this example, that point is APC target 112 which is different from the new constrained economic optimum 110.

However, since RTO modules traditionally run infrequently in comparison to APC modules, the APC module will drive towards the old set-point targets (i.e. constrained economic optimum 104) for an extended period of time while it awaits a new set of set-point targets (i.e. new constrained economic optimum 108) which either takes advantage of the greater room for operation or economically adjusts for a reduction in the feasible region resulting from a change to constraint 106. Potentially a great sum of profit will be lost between when constraint 106 is changed and when the APC module receives a new set of set-point targets.

Therefore, according to conventional approaches for coordinating operations between an RTO module and an APC module, as described above, when disturbances enter the process (e.g. ambient temperature variation, operator limits changes, etc.), the APC module continues to try to hold the process at the target values originally set by the RTO module. These disturbances may change the constraints relative to the targets, either by relaxing active constraints or making the targets infeasible. In the first case, the APC module does not take advantage of the extra "room" within the feasible region because the APC module is unaware of the extra "room" precipitated by the relaxation of the active constraints. In the second case, the APC module gets as close as possible to the targets using non-economic criteria and arrives at possibly a non-optimum economic point. In either case the conventional APC module's strategy does not seek to optimize profit.

Further, as mentioned above, RTO modules traditionally run relatively infrequently with respect to APC modules. One example is an RTO module running hourly compared to an APC module running every minute. RTO solutions lag behind changes in the process because of RTO modules' infrequent operation. The time between when a disturbance enters the process and new targets from the RTO module that account for the disturbance is passed to APC modules represents lost opportunity. The more significant the disturbance (in magnitude and duration), the more likely the time between receiving updated targets from the RTO module will increase, since the RTO module requires the process to be in a steady-state to calculate new targets.

Technology available today for linking APC modules and RTO modules utilize a remote set-point passing strategy. Translation of objectives in this fashion results in a loss of economic information as the APC module has no information about the original process economics and is vulnerable to disturbances to the process or changes to operating constraints.

Thus, there is a desire for a system and method for coordinating execution of a RTO module with an APC module to more closely approach optimal economic operation of a manufacturing process.

BRIEF DESCRIPTION OF THE FIGURES

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1$a$ is a graph of the process control variables TG1 and TG2 which relate to a manufacturing process.

FIG. 1$b$ is a graph of the process control variables TG1 and TG2 which relate to a manufacturing process after a disturbance.

FIG. 1$c$ is a graph of the process control variables TG1 and TG2 which relate to a manufacturing process after a disturbance.

FIG. 5$a$ is a graph of the process control variables $Q_f$ and $T_a$ which relate to a manufacturing process.

FIG. 5$b$ is a graph of the process control variables $Q_f$ and $T_a$ which relate to a manufacturing process after a disturbance.

FIG. 5$c$ is a graph of the process control variables $Q_f$ and $T_a$ which relate to a manufacturing process after a disturbance.

DETAILED DESCRIPTION

Several embodiments of the invention with reference to the appended drawings are now explained. While numerous details are set forth, it is understood that some embodiments of the invention may be practiced without these details. In other instances, well-known structures, and techniques have not been shown in detail so as not to obscure the understanding of this description.

Figure 2:
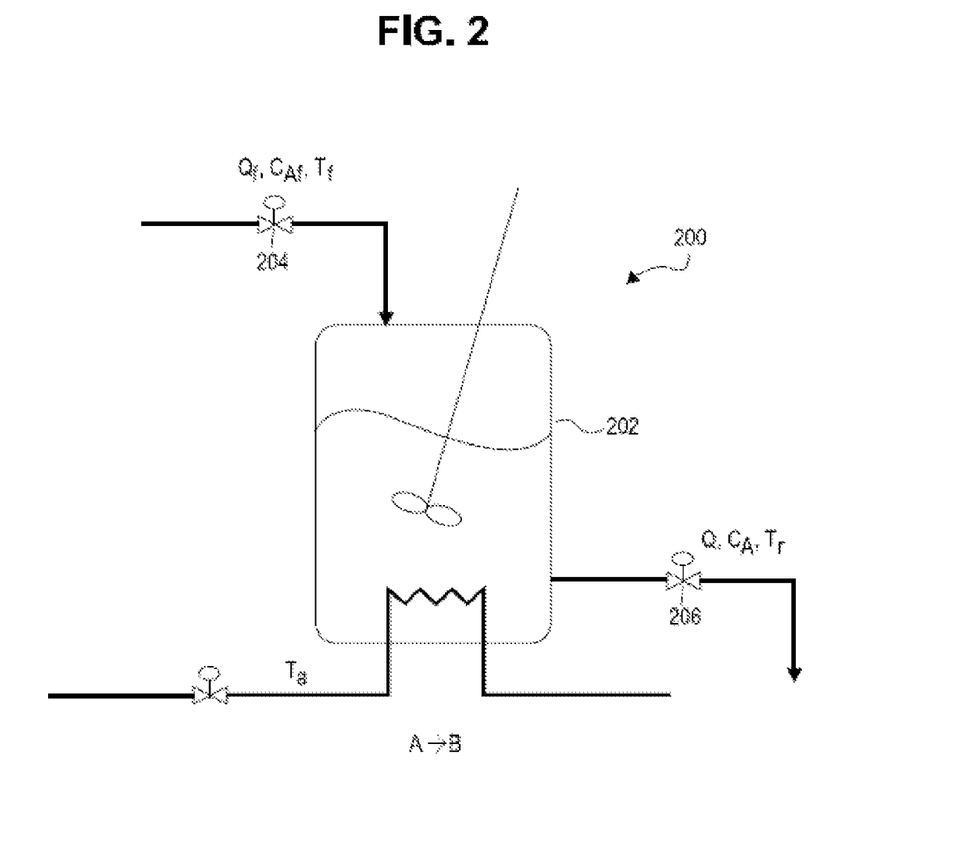
FIG. 2 illustrates a manufacturing process, in accordance with an embodiment of the invention.
Figure 3:
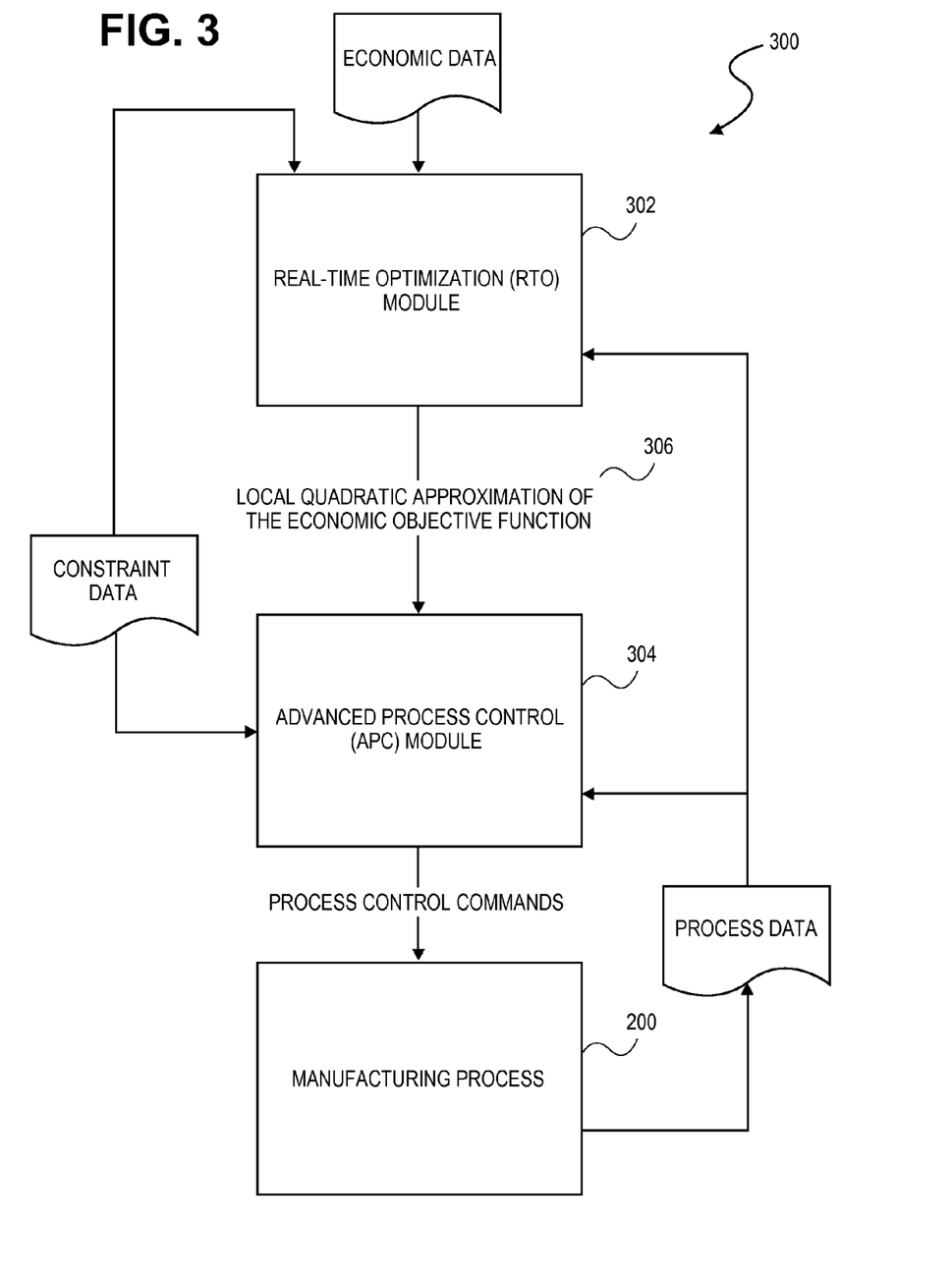
FIG. 3 is a system diagram of a process control and optimization system, in accordance with an embodiment of the invention.

FIG. 2 illustrates manufacturing process 200. Manufacturing process 200 converts substance A into substance B using reactor vessel 202. Manufacturing process 200 includes inlet valve 204 which releases a liquid which contains substances A and B into reactor vessel 202 at feed concentration $C_{Af}$, feed flow rate $Q_f$, and feed temperature $T_f$. Reactor vessel 202 converts substance A to substance B. The temperature of reactor vessel 202 is regulated with coolant at coolant temperature $T_a$. At outlet valve 206, a combination of substance A and B emerges. Substance A is released from outlet valve 206 at concentration $C_A$, temperature $T_r$, and flow rate Q while substance B is released from outlet valve 206 at concentration $C_B$, temperature $T_r$, and flow rate Q. A system and method for controlling manufacturing process 200 will be discussed below in relation to FIGS. 3-5. FIG. 3 illustrates process control and optimization system 300 according to one embodiment. Process control and optimization system 300 drives manufacturing process 200 through the use of Real-Time Optimization (RTO) module 302 and Advanced Process Control (APC) module 304 such that manufacturing process 200 operates in an economically optimal manner.

RTO module 302 acts as an operator of manufacturing process 200 by constructing a function that describes the economic surface around the current operating point for manufacturing process 200 such that manufacturing process 200 may achieve a set goal. APC module 304 acts as the controller of manufacturing process 200 which receives the economic function from RTO module 302 and constructs a path or plan based on the economic function to achieve the set goal.

In one embodiment, the set goal (i.e. economic objective) is to achieve an optimum of an economic objective function for manufacturing process 200. The economic optimum for manufacturing process 200 corresponds to a state of manufacturing process 200 at which economic profits are maximized. Although the economic optimum as used herein is described in terms of maximizing profits, the economic optimum could alternatively be focused toward minimizing energy consumption of manufacturing process 200, maximizing throughput of manufacturing process 200, or any other aspect of manufacturing process 200 that has an economic, safety, environmental, or reliability impact.

In one embodiment, the economic function is defined by a non-linear steady state economic objective function, which is constructed by RTO module 302. The economic objective function models manufacturing process 200 and may be used by APC module 304 to control operation of manufacturing process 200 in an effort to achieve the set goal. However, instead of communicating the economic objective function to APC module 304, RTO module 302 derives a local quadratic approximation of economic objective function 306 and communicates that approximation to APC module 304.

Local quadratic approximation of the economic objective function 306 abstracts the complexity of the economic objective function while still providing a representative assessment of the location of the economic optimum in terms of process control variables. Accordingly, APC module 304 may analyze the location of the constrained economic optimum at a higher frequency than RTO module 302, because local quadratic approximation 306 is simplified in comparison to the economic objective function. In some embodiments, the entire set or a subset of the process control variables may be advance process control variables.

In one embodiment, RTO module 302 derives a local quadratic approximation of economic objective function 306 using a Sequential Quadratic Programming (SQP) solver. The SQP solver constructs a local quadratic approximation at each iteration of its solution. The local quadratic approximation from the last iteration of the solver corresponds to local quadratic approximation of the economic objective function 306.

In one embodiment, RTO module 302 and APC module 304 may operate upon a desktop computer, a laptop computer, a netbook computer, a mainframe computer, or any other similar computing platform which is capable of computing a local quadratic approximation of an economic objective function and controlling a manufacturing process based on the local quadratic approximation. In one embodiment, RTO module 302 and APC module 304 may operate on separate computers and communicate through a network such as a wide-area network, a local-area network, cellular network, a point-to-point network, etc. In another embodiment, RTO module 302 and APC module 304 each operate on the same computer working in parallel.

The system and method for controlling the manufacturing process 200 based on local quadratic approximation of the economic objective function 306 will now be described in greater detail.

Figure 4:
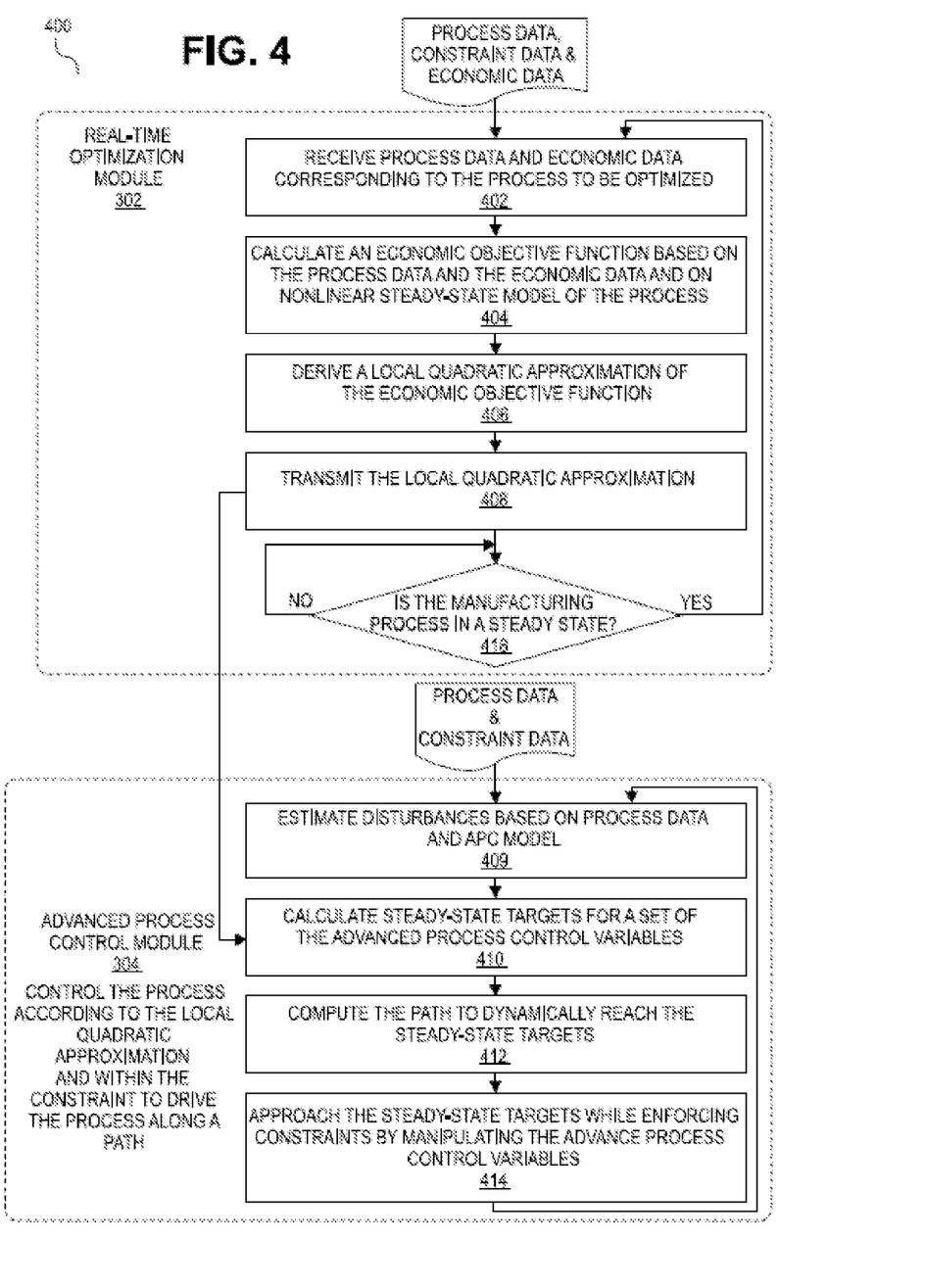
FIG. 4 is a data flow of a manufacturing process control method for controlling a manufacturing process, in accordance with an embodiment of the invention.

FIG. 4 illustrates manufacturing process control method 400 for controlling manufacturing process 200 according to one embodiment. Manufacturing process control method 400 of FIG. 4 may be performed by process control and optimization system 300 such that manufacturing process control method 400 is performed partly by both RTO module 302 and APC module 304. Accordingly, manufacturing process control method 400 of FIG. 4 designates operations performed by RTO module 302 and operations performed by APC module 304.

Manufacturing process control method 400 commences operation following receipt of process, constraint and economic data from a user at block 402. A user may be a human operator, a machine, or a combination that transfers the process and economic data to manufacturing process control method 400. In one embodiment, the process, constraint and economic data are received by RTO module 302 through a push or pull data retrieval scheme.

The process data includes measured numerical and/or conditional values corresponding to components or operations of manufacturing process 200. For example, the process data may comprise flow rate of a stream, pressure in a reactor vessel, temperature of a stream, in-service status of a heat exchanger, etc. The constraint data includes lower and upper limits on process variables. The economic data includes economic values associated with raw materials input into manufacturing process 200, economic values associated with products produced by manufacturing process 200 or economic values associated with performing operations in manufacturing process 200. For example, economic data may be comprised of the prices of a utility, such as electricity, the price of a raw material, etc.

In one embodiment, a non-linear steady state mathematical model of manufacturing process 200 is used by manufacturing process control method 400 at block 404. Specifically, the non-linear steady state mathematical model may be used by RTO module 302. In one embodiment, communication of the process data, constraint data and the economic data to the mathematical model is performed through the use of a network medium while in another embodiment the process data, constraint data and the economic data are communicated to the mathematical model through the use of shared memory. The non-linear steady state mathematical model is composed of one or more equations which establish a relationship between the physical components of manufacturing process 200. The equations which compose the mathematical model define relationships between the process variables of manufacturing process 200, including inputs and outputs of manufacturing process 200. For example, in manufacturing process 200, the process variables may include feed concentration of A at the inlet ($C_{Af}$), feed flow rate at the inlet ($Q_f$), feed temperature at the inlet ($T_f$), coolant temperature ($T_a$), concentration of A at the outlet ($C_A$), reactor vessel temperature ($T_r$), concentration of B at the outlet ($C_B$), and the product flow rate at the outlet (Q).

In one embodiment, the process control variables are a set of the process variables, either the entire set of process variables or a subset of the process variables, wherein the process variables may be manipulated variables, control variables, or a combination of manipulated and control variables. A manipulated variable corresponds to a variable whose condition or quantity when altered (manipulated) regulates or initiates a change in a condition or quantity of a control variable. For example, in manufacturing process 200, feed flow rate at the inlet ($Q_f$), and coolant temperature ($T_a$) may be manipulated variables, because these variables may be directly adjusted by an operator of manufacturing process 200. Further, concentration of A at the outlet ($C_A$), reactor vessel temperature ($T_r$), concentration of B at the outlet ($C_B$), and product flow rate at the outlet (Q) may be considered control variables because alterations of the manipulated variables described above would result in changes to these variables.

Following the receipt of the process data and the economic data, process control method 400 calculates an economic objective function in terms of the received process and economic data at block 404. In one embodiment, parameters in the mathematical model are adjusted to minimize the difference between the model and the process data. Thereafter, the economic objective function is expressed in terms of the process variables represented in the model and the economic data. Accordingly, based on the combination of process and economic data with the mathematical model, the derived economic objective function relates manufacturing process components and operations with current economic factors.

The calculated economic objective function represents the operating economics of manufacturing process 200 that is controlled by manufacturing process control method 400.

Although the constrained economic optimum may be derived from the economic objective function, the complexities of typical manufacturing processes require mathematically complex economic objective functions to represent them. Accordingly, processing the economic objective function to derive the constrained economic optimum for manufacturing process 200 is costly in terms of time and processing power.

Disturbances are defined as changes to any of the values that are input to process control method 400, including process data, economic data or constraint data. In general, a disturbance is any occurrence which affects the performance of manufacturing process 200. For example, a disturbance may be related to a change to the process, which may be caused by natural phenomenon (e.g. variations to the outside temperature) or a change to the economics (e.g. fluctuations in the prices of raw materials). Alternatively, a disturbance may be related to a constraint change, which may be caused, for example, by a change in a previously set constraint (e.g. adjusting the constraints placed on a variable by a controller) or the introduction of a limit to a new variable. As a disturbance enters the environment of manufacturing process 200, the economic optimum for operating manufacturing process 200 shifts. Accordingly, manufacturing process control method 400 shifts operation of manufacturing process 200 to address the disturbance such that the manufacturing process 200 is focused on the new economic optimum precipitated by the disturbance. An example of the effect of a disturbance is illustrated in FIGS. 1a, 1b and 1c where disturbances moved the location of constraint 106 creating new constrained economic optimum 108 and constrained economic optimum 110.

To reduce the cost of determining the economic optimum of manufacturing process 200, the process control method 400 derives local quadratic approximation of the economic objective function 306 in terms of process control variables at block 406. Local quadratic approximation of the economic objective function 306 abstracts the complexity of the economic objective function while still providing a representative assessment of the economic surface near the current operating point of manufacturing process 200.

Based on the reduced complexity of local quadratic approximation 306, a representative approximation of the constrained economic optimum may be derived in a shorter period of time and with a reduced processing load on a computer system such as the computer system of APC module 304. Accordingly, by deriving an approximated constrained economic optimum based on local quadratic approximation of the economic objective function 306, process control and optimization system 300 may calculate an approximated constrained economic optimum at a greater frequency in comparison to using the economic objective function.

In one embodiment, local quadratic approximation of the economic objective function 306 is derived through successive approximations of the economic objective function. In one embodiment, local quadratic approximation of the economic objective function 306 is consists of a non-linear, second order component and a linear first order component. In this embodiment, the non-linear, second order component may be a Hessian matrix and the linear, first order component may be a gradient vector. Collectively, the Hessian matrix and the gradient vector represent an economic surface in terms of the entire set or a subset of the process control variables. In one embodiment the subset of process controls variables may correspond to the manipulated variables in the APC module 304. In one embodiment, local quadratic approximation of the economic objective function 306 is constructed by the OPERA solver in software package Rigorous On-line Modeling with equation-based optimization (ROMeo®) by Sim-Sci-Esscor which may be a part of RTO module 302. In one embodiment, the local quadratic approximation is derived when the solver is used to optimize the economic objective function subject to the constraint data.

After being derived, local quadratic approximation of the economic objective function 306 is transmitted from RTO module 302 to APC module 304 at block 408 of process control method 400. In one embodiment, communication of local quadratic approximation of the economic objective function 306 from RTO module 302 to APC module 304 is performed through the use of a network or bus medium while in another embodiment local quadratic approximation of the economic objective function 306 is communicated through the use of a shared memory. In one embodiment, APC module 304 receives constraint data associated with the process control variables of the manufacturing process 200 from a source external to process control and optimization system 300 such as a human operator of manufacturing process 200.

Upon receipt of local quadratic approximation of the economic objective function 306, APC module 304 controls manufacturing process 200 based on local quadratic approximation of the economic objective function 306 subject to constraints placed on the process control variables. By utilizing local quadratic approximation of the economic objective function 306 instead of set-point targets set by RTO module 302, APC module 304 is aware of impact of changes in operating conditions on economics of manufacturing process 200 at all times of operation. By maintaining knowledge of the contours of the economic objective function, APC module 304 may appropriately shift focus to a new constrained economic optimum precipitated by a disturbance to manufacturing process 200.

Figure 5A:
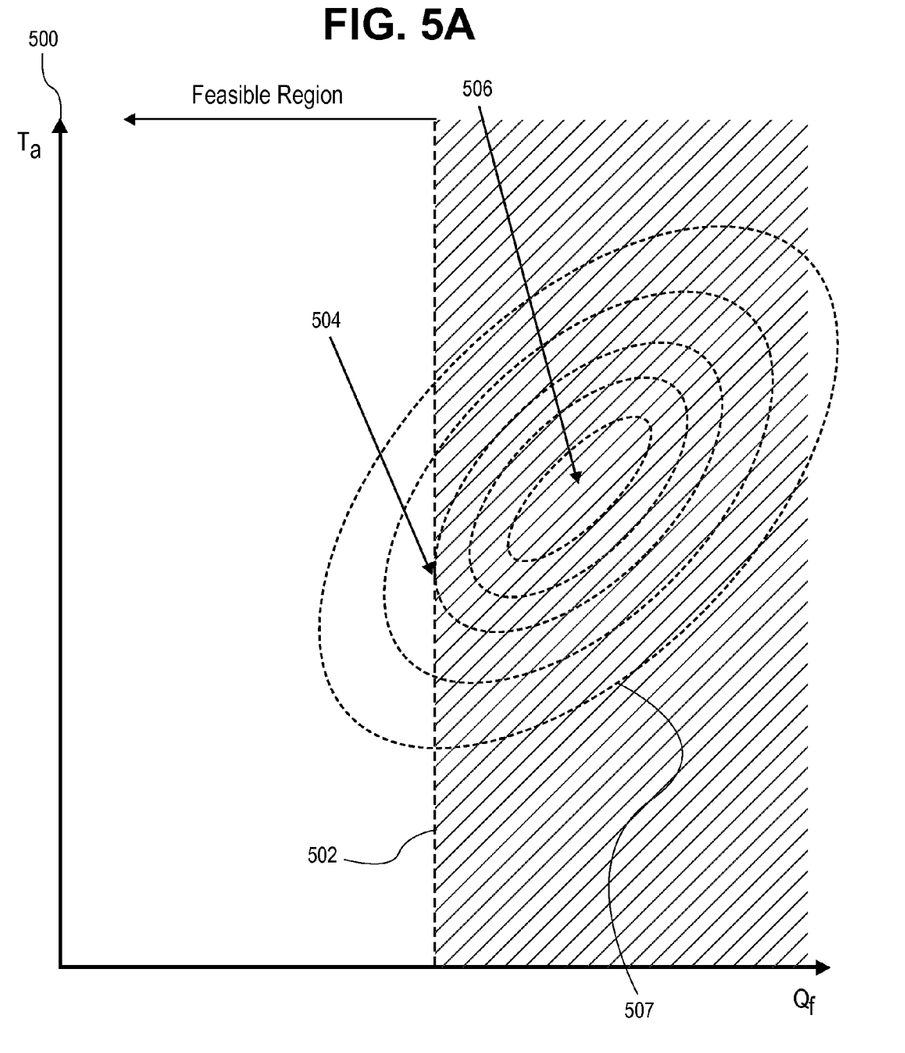

For example, FIG. 5a illustrates graph 500 of variables $Q_f$ and $T_a$ for manufacturing process 200. An operator of manufacturing process 200 may apply constraint 502 to $Q_f$ such that $Q_f$ does not rise above ten cubic meters per second. Accordingly, APC module 304 calculates steady state targets for both $Q_f$ and $T_f$ using local quadratic approximation of the economic objective function 306 which honors constraint 502 placed on $Q_f$ (i.e. $Q_f \leq$ ten cubic meters per second). The steady state targets for $Q_f$ and $T_a$ are associated with constrained economic optimum 504 for manufacturing process 200. APC module 304 is also aware of the contours of economic objective function 507 around unconstrained economic optimum 506. Although unconstrained economic optimum 506 represents values for $Q_f$ and $T_a$ which provide for greater profitability for manufacturing process 200 in comparison to constrained economic optimum 504, APC module 304 drives manufacturing process 200 toward constrained economic optimum 504 because constraint 502 must be honored.

Figure 5B:
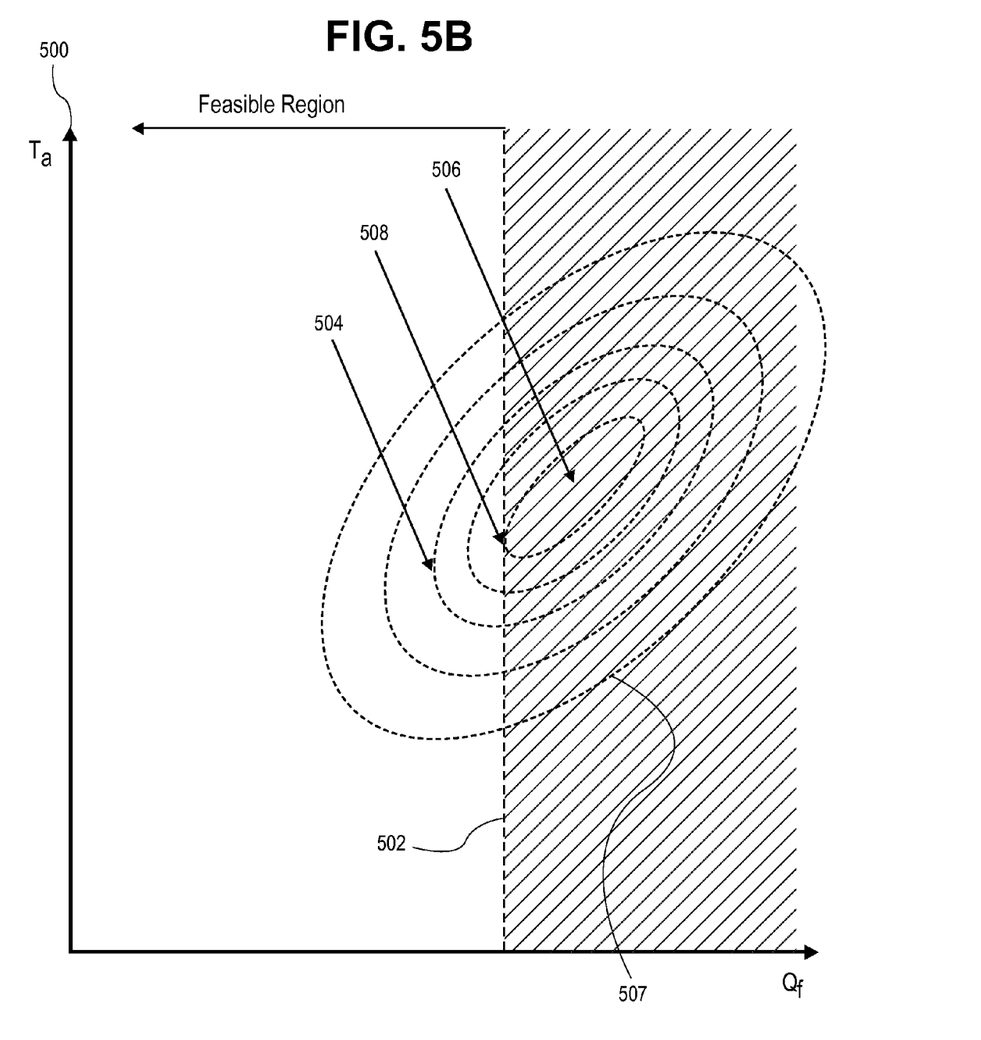
Figure 5C:
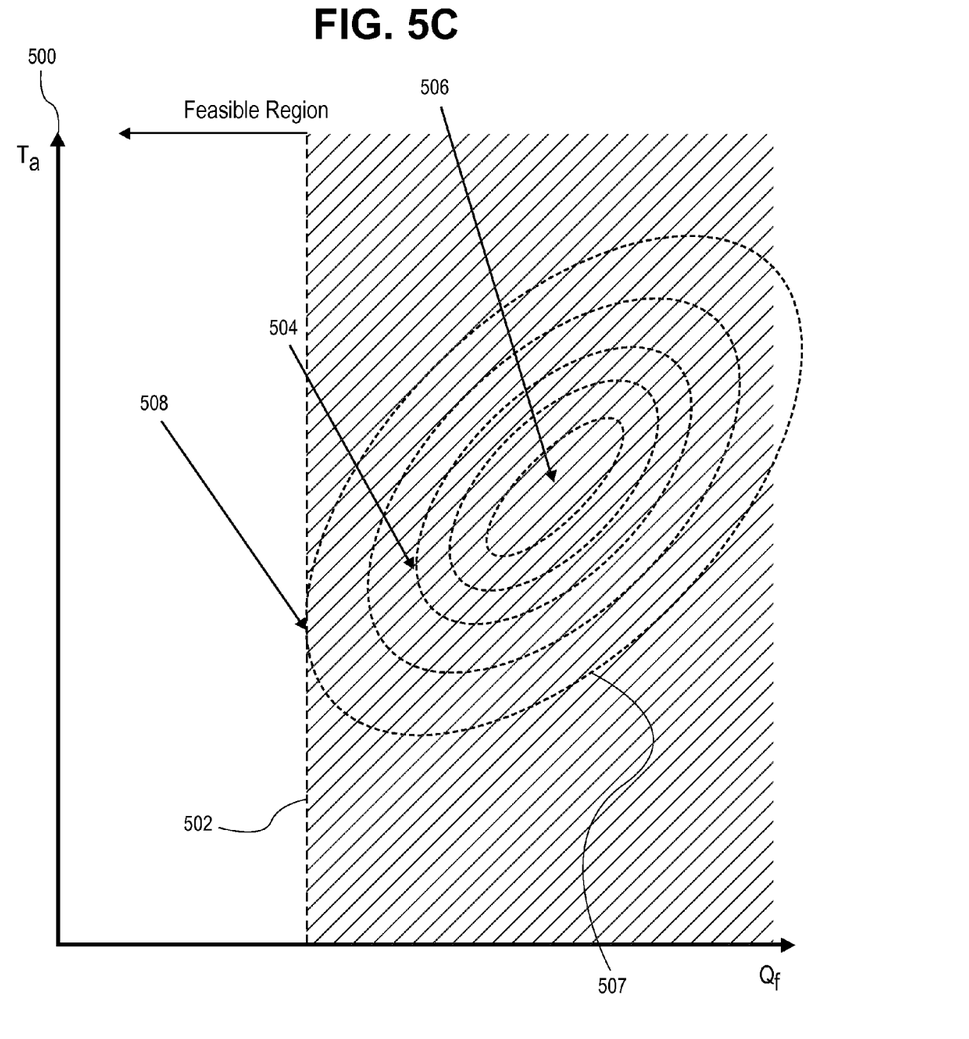

FIGS. 5b and 5c illustrate graphs of $Q_f$ versus $T_a$ after the occurrence of disturbances. In FIG. 5b, a disturbance changes constraint 502 such that more "room" is provided for $Q_f$, for example, by changing constraint 502 from $Q_f \leq$ ten cubic meters per second to $Q_f \leq$ twelve cubic meters per second. In FIG. 5c, a disturbance changes constraint 502 such that less "room" is provided for $Q_f$, for example, by changing constraint 502 from $Q_f \leq$ ten cubic meters per second to $Q_f \leq$ eight cubic meters per second. In either case, new constrained economic optimum 508 is created. Consequently, APC module 304 steers the process toward new constrained economic optimum 508 as described below. For brevity, the procedure for steering the process towards new constrained economic optimum 508 in light of the disturbance of FIG. 5b will only be discussed. However, a similar procedure may be used to steer the process towards new constrained economic optimum 508 in light of the disturbance of FIG. 5c.

Based on local quadratic approximation of the economic objective function 306, APC module 304 can take advantage of the increased room for movement for $Q_f$ caused by the movement of constraint 502 by the disturbance of FIG. 5b and steer the process toward new constrained economic optimum 508 which is closer to unconstrained economic optimum 506. APC module 304 shifts manufacturing process 200 toward new steady state targets for $Q_f$ and $T_a$ instead of waiting for direction from RTO module 302 as would be done in a traditional set-point process control system. Thus, potentially a great deal of profit will be realized by not adhering to old targets while waiting for RTO module 302 to provide new set-point targets, but instead deriving new economically optimal steady state targets for variables $Q_f$ and $T_a$ based on local quadratic approximation of the economic objective function 306. The method by which APC module 304 shifts the focus of manufacturing process 200 from constrained economic optimum 504 to new constrained economic optimum 508 in the face of a disturbance will be described below.

As discussed earlier for process control method 400, at each execution of the RTO module 302, an approximation of the manufacturing economic objective function is communicated to the APC module 304. Block 409 computes estimates of the disturbances based on the process data and the APC model. Block 410 of APC module 306 optimizes this approximated economic objective function over the space of manipulated and controlled variables and subject to the APC model, latest disturbance estimates, and process constraints to determine a set of economically optimal steady-state targets for the APC module. In one embodiment, a standard quadratic program solver such as QPSOL/IPOPT is used to optimize the economic objective function. A linear dynamic model is used in APC module 306 to represent relationships between the manipulated and controlled variables of manufacturing process 200. For computing the constrained economic optimum, a steady-state representation of the linear dynamic model is used. Disturbance estimates are an important element of the APC model and are obtained by using a state estimator for unmeasured disturbances and real time measurements for measured disturbances. Process constraints are represented as inequality constraints in the optimization problem. In another embodiment, the elements of the Hessian matrix and gradient vector are communicated to an Exasmoc® APC controller by Yokogawa Electric Corporation at each execution of the RTO module 302. The Exasmoc® controller optimizes this economic objective subject to the linear process model, constraints and disturbance estimates. The solution of this optimization problem at each execution of APC module 306 yields steady-state targets that the APC module aims to steer the process towards.

At the period of time at which the RTO module 302 executes, constrained economic optimum 504 represents a steady state of manufacturing process 200 at which economic profits are maximized while still honoring all constraints (hence a feasible, economically optimal steady state). In one embodiment, constrained economic optimum 504 is expressed as steady state targets for one or more process control variables which are a part of manufacturing process 200. For example, as discussed above, constrained economic optimum 504 may be represented as steady state targets for feed flow rate at the inlet ($Q_f$) and coolant temperature ($T_a$).

In the period between RTO executions, changes to the operating conditions of manufacturing process 200 may occur. These changes may be in the form of constraint changes or new process disturbances to manufacturing process 200. In one embodiment, new disturbance estimates are computed at each execution of APC module 306. The economic optimization problem based on local quadratic approximation of the economic objective function 306 is solved at each execution of APC module 306 to calculate the economically optimal steady-state targets under the new process and/or constraint conditions.

At block 412 of process control method 400, a path is determined for the process control variables such that they reach the computed economically optimal steady state target 508 derived at block 410 under the latest set of constraints and process conditions. In one embodiment, the path includes a forecast of moves of the manipulated variables such that the process control variables are steered to attain the economically optimal steady state targets. In another embodiment, intermediate targets are generated prior to arriving at constrained economic optimum 508 of manufacturing process 200. For example, for feed flow rate at the inlet ($Q_f$) with an ultimate target of eleven cubic meters per second, a set of intermediate targets may include two cubic meters per second, four cubic meters per second, six cubic meters per second, eight cubic meters per second, and ten cubic meters per second. The path terminates upon reaching the target of eleven cubic meters per second corresponding to constrained economic optimum 508.

In one embodiment, the computed path may be the fastest route to constrained economic optimum 508. In one embodiment, ranks and/or weights are applied to one or more process control variables such that a target associated with a higher ranked or higher weighted process control variable is deemed more important by the process control method 400 than a lower ranked or less-weighted process control variable. Accordingly, a highly weighted process control variable is deemed more important than a less weighted process control variable. For example, feed flow rate at the inlet valve ($Q_f$) may be deemed more important than coolant temperature ($T_a$). Thus, $Q_f$ is associated with a weight such APC module 304 treats the target for $Q_f$ with greater urgency than the target for $T_a$. In another embodiment, the computed path is the economically optimal trajectory to achieving the economically optimal steady state based on the local quadratic approximation of the economic objective function 306.

In one embodiment, the computed path is a forecast. At each execution of the APC module 306, only the first move for each manipulated variable in the generated path for achieving the economically optimal steady-state 508 is applied to the process. At the next APC execution cycle, a new forecast is generated and again, only the first move for each manipulated variable is applied.

In one embodiment, at each execution of the process control module, the system state and unmeasured disturbances are estimated using a Kalman filter in which the linear dynamic model is augmented with input and/or output disturbance models. While computing the economically optimal steady-state targets, the current limits on manipulated and controlled variables are used. The frequency at which process control method 400 executes may be preset by a user upon commencement of process control method 400. For example, APC module 304 may execute every minute as described.

Thereafter, process control method 400 continues operation as previously described such that the process is steered towards the new constrained economic optimum 508.

Specifically, the process control variables associated with manufacturing process 200 are manipulated to traverse the path toward new constrained economic optimum 508.

Consequently, process control method 400 continues to account for disturbances and adjust new constrained economic optimum 508 as needed.

If the manufacturing process 200 is in a steady state, as determined at block 418, process control method 400 reverts to block 402 such that a new local quadratic approximation of the economic objective function is derived based on the current state of manufacturing process 200. In one embodiment, fresh process data and the economic data are read into process control method 400 based on currently sensed values. As described above, the new local quadratic approximation of the economic objective function is calculated by RTO module 302 and transmitted to APC module 304. This new local quadratic approximation of the economic objective function takes into account changes in economic data or in the state of the process equipment since the last local quadratic approximation was derived. It also takes into account changes in the shape of the nonlinear economic objective function resulting from changing the operating point, which are not captured in the local quadratic approximation of the economic objective function. Based on this newly derived local quadratic approximation of the economic objective function, process control method 400 guides the control variables to new constrained economic optimum. Consequently, process control method 400 continues to monitor for disturbances and adjust targets for process control variables as needed.

To conclude, various aspects of a system and method for driving a manufacturing process to a constrained economic optimum by using a local quadratic approximation of an economic objection function passed from an RTO module to an APC module have been described. As explained above, an embodiment of the invention may be a machine-readable medium such as one or more solid state memory devices having stored thereon instructions which program one or more data processing components (generically referred to here as "a processor") to perform some of the operations described above. In other embodiments, some of these operations might be performed by specific hardware components that contain hardwired logic. Those operations might alternatively be performed by any combination of programmed data processing components and fixed hardware circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method for control and optimization of a process, comprising:
   receiving process data and economic data corresponding to the process to be controlled;
   calculating an economic objective function based on the process data, the economic data and a nonlinear steady-state model of the process;
   deriving a non-linear approximation of the economic objective function in terms of a set of process control variables associated with the process;
   transmitting the non-linear approximation to an advanced process control module; and
   controlling the process according to the non-linear approximation and within a constraint to drive the process toward a constrained economic optimum by the advanced process control module;
   wherein the calculation of the economic objective function and the derivation of the non-linear approximation of the economic objective function are performed at a frequency lower than controlling the process according to the non-linear approximation by the advanced process control module.

2. The method of claim 1, wherein controlling the process according to the non-linear approximation comprises:
   utilizing the non-linear approximation in the advanced process control module to calculate a steady state target for a process control variable, wherein the steady state target is calculated relative to the economic objective within the constraint.

3. The method of claim 2, wherein controlling the process according to the non-linear approximation further comprises:
   utilizing the non-linear approximation in the advanced process control module to compute a path to dynamically reach the steady state target.

4. The method of claim 1, wherein controlling the process according to the non-linear approximation further comprises:
   utilizing the non-linear approximation in the advanced process control module to calculate a dynamic path relative to the economic objective within the constraint.

5. The method of claim 1, wherein the calculation of the economic objective function, the derivation of the non-linear approximation of the economic objective function, and the transmission of the non-linear approximation are initiated when the process is in a steady state.

6. The method of claim 1, wherein control of the process according to the non-linear approximation and within the constraint to drive the process toward the economic objective by the advanced process control module is performed independent of the process being in a steady state.

7. The method of claim 1, wherein the economic objective function is calculated by a real-time optimization module.

8. A method for control and optimization of a process, comprising:
   receiving process data and economic data corresponding to the process to be controlled;
   calculating an economic objective function based on the process data, the economic data and a nonlinear steady-state model of the process;
   deriving a non-linear approximation of the economic objective function in terms of a set of process control variables associated with the process;
   transmitting the non-linear approximation to an advanced process control module; and
   controlling the process according to the non-linear approximation and within a constraint to drive the process toward a constrained economic optimum by the advanced process control module;
   wherein the non-linear approximation is comprised of a Hessian matrix and a gradient vector which represent an economic surface in terms of the set of process control variables of the process.

9. A method for control and optimization of a process, comprising:

receiving process data and economic data corresponding to the process to be controlled;

calculating an economic objective function based on the process data, the economic data and a nonlinear steady-state model of the process;

deriving a non-linear approximation of the economic objective function in terms of a set of process control variables associated with the process;

transmitting the non-linear approximation to an advanced process control module; and controlling the process according to the non-linear approximation and within a constraint to drive the process toward a constrained economic optimum by the advanced process control module;

wherein the non-linear approximation of the economic objective function is a local quadratic approximation of the economic objective function.

10. A system for coordinating advanced process control and real-time optimization of a process, comprising:

a real-time optimization (RTO) module for calculating an economic objective function based on process data, economic data and a nonlinear steady-state model of the process and deriving a non-linear approximation of the economic objective function in terms of a set of process control variables of the process; and an advanced process control (APC) module for controlling the process according to the non-linear approximation and within a constraint to drive the process toward the economic objective;

wherein the RTO module operates at a lower frequency than the APC module.

11. The system of claim 10, wherein controlling the process according to the non-linear approximation by the APC module comprises:

utilizing the non-linear approximation to calculate a steady state target for one of the process control variables, wherein the steady state target is calculated relative to the economic objective within the constraint.

12. The system of claim 11, wherein controlling the process according to the non-linear approximation by the APC module further comprises:

utilizing the non-linear approximation to compute a path to dynamically reach the steady state target.

13. The system of claim 10, wherein controlling the process according to the non-linear approximation by the APC module further comprises:

re-calculating the steady state target for the process control variables based on the non-linear approximation in response to changes in the process or constraint changes to constraints on the process;

re-computing the path based on the recalculated steady state target with the non-linear approximation.

14. The system of claim 10, wherein the RTO module operates when the process is in a steady state.

15. An article of manufacture comprising a machine readable medium having stored instructions that, when executed by a computer system:

receive process data and economic data corresponding to the process to be controlled;

calculate an economic objective function by a real-time optimization module based on the process data, the economic data and a nonlinear steady-state model of the process;

derive a non-linear approximation of the economic objective function by the real-time optimization module in terms of a set of process control variables associated with the process;

transmit the non-linear approximation to an advanced process control module; and control the process according to the non-linear approximation and within a constraint to drive the process toward the economic objective by the advanced process control module;

wherein the non-linear approximation of the economic objective function is a local quadratic approximation of the economic objective function.

16. The article of manufacture of claim 15, wherein the machine readable medium has instructions that causes the computer system to:

utilize the non-linear approximation in the advanced process control module to calculate a steady state target for a process control variable, wherein the steady state target is calculated relative to the economic objective within the constraint.

17. The article of manufacture of claim 16, wherein the machine readable medium has instructions that causes the computer system to:

utilize the non-linear approximation in the advanced process control module to compute a path to dynamically reach the steady state target.

18. The article of manufacture of claim 17, wherein the machine readable medium has instructions that causes the computer system to:

re-calculate the steady state target for the process control variable based on the non-linear approximation in response to changes in the process or a constraint change to the process;

re-compute the path based on the recalculated steady state target with the non-linear approximation.

* * * * *